United States Patent [19]
Giroud et al.

[11] Patent Number: 5,693,883
[45] Date of Patent: Dec. 2, 1997

[54] ELECTROMAGNETIC ACCELEROMETER

[75] Inventors: Pierre Giroud, Bourg Les Valence; Pierre Guillemin, Chabeuil; Sylvie Pedraza-Ramos, Valence; Andre Migeon, Barcelonne, all of France

[73] Assignee: Sextant Avionique, Velizy Villacoublay, France

[21] Appl. No.: 653,682

[22] Filed: May 23, 1996

[30] Foreign Application Priority Data

May 24, 1995 [FR] France ................... 95 06403

[51] Int. Cl.$^6$ ........................................ G01P 15/13
[52] U.S. Cl. ........................................ 73/514.24
[58] Field of Search .................. 73/514.24, 514.16, 73/514.17, 514.18, 514.33, 514.34, 514.38

[56] References Cited

U.S. PATENT DOCUMENTS 4,987,781  1/1991  Reimann ................. 73/514.33
5,008,774  4/1991  Bullis et al. ............. 73/514.38
5,203,210  4/1993  Terry et al. .............. 73/514.37

*Primary Examiner*—John E. Chapman
*Attorney, Agent, or Firm*—Plevy & Associates

[57] ABSTRACT

An electromagnetic accelerometer includes a moving mass suspended to a peripheral frame and associated with stress gauges forming sensors for detecting the displacement of the moving mass which supports a coil, and a permanent magnet which is associated with a magnetic circuit formed by two pole pieces defining two air-gaps for channeling the magnetic field of the magnet. The moving mass includes a central recess having a surface at least equal to the surface of a free extremity of a first pole piece of the magnetic circuit and forming a shoulder for receiving the coil, the free extremity of the shoulder leading inside the air-gaps.

8 Claims, 6 Drawing Sheets

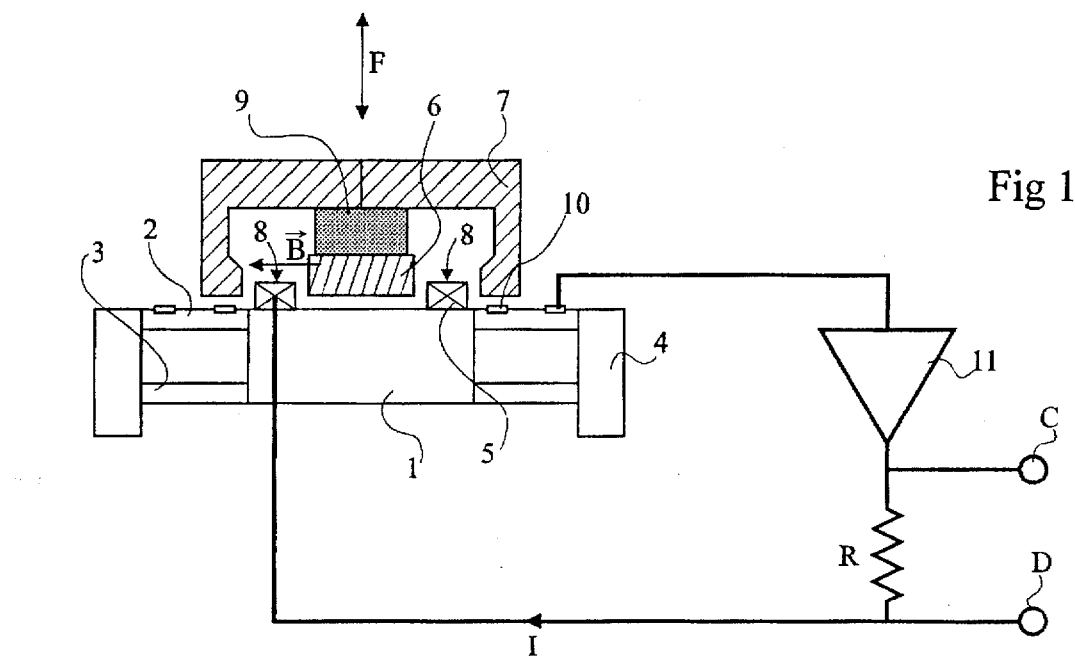
Fig 1
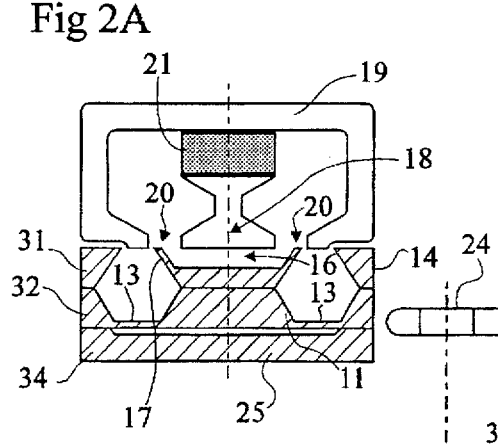
Fig 2A
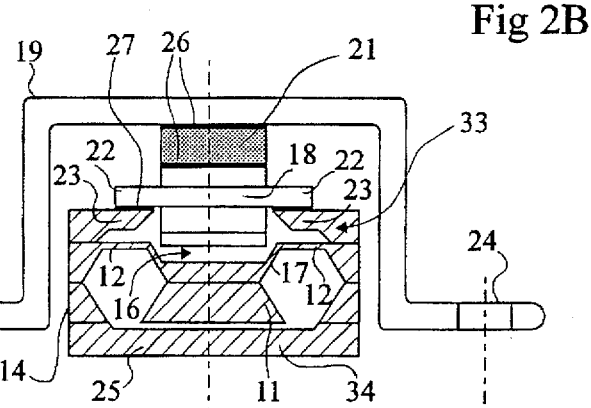
Fig 2B
Fig 2C

ELECTROMAGNETIC ACCELEROMETER

BACKGROUND OF THE INVENTION

1. Field of the Invention

The present invention relates to an electromagnetic accelerometer including a moving mass and piezoelectric gauges for detecting the displacement of the mass and for controlling a device servocontrolling the position of the mass by using electromagnetic induction phenomena. The invention more particularly relates to a miniaturized implementation of such an accelerometer using silicon plates and techniques derived from those developed for manufacturing integrated circuits.

2. Discussion of the Related Art

The stress gauges of an accelerometer are designed to generate, through an electronic circuit, a current supplying a coil to compensate, by electromagnetic induction phenomena, for the displacement of a seismic mass in response to external conditions, for example, seismic motion. The value of the displacement that the moving mass would have, in the absence of the compensation, is determined from the value of the coil supply current needed to prevent the displacement.

SUMMARY OF THE INVENTION

An object of the present invention is to provide an electromagnetic accelerometer having a very high (higher than 140 dB) intrinsic signal/noise ratio, adapted to withstand severe shocks (for example up to 2000 g).

A further object of the invention is to provide such an accelerometer which is sensitive to low frequencies, ranging for example from steady state to 300 Hz.

A still further object of the invention is to provide an electromagnetic accelerometer having a current response which is linear with respect to the acceleration of the moving mass.

To achieve these objects, the present invention provides an electromagnetic accelerometer including a moving mass suspended to a peripheral frame and associated with stress gauges forming sensors for detecting the displacement of the moving mass which supports a coil, and a permanent magnet associated with a magnetic circuit formed by two pole pieces defining two air-gaps for channeling the magnetic field of the magnet. The moving mass includes a central recess having a surface area at least equal to the surface area of a free extremity of a first pole piece of the magnetic circuit and forming a shoulder for receiving the coil, the free extremity of the shoulder leading inside the air-gaps. The moving mass is formed by the superposition of at least two plates of a non-magnetic material. The first plate forms a first portion of the moving mass which includes, from a first surface, the recess forming the shoulder supporting the coil, and which is coupled, by two aligned upper hanging legs, to a first portion of the peripheral frame. The second plate forms a second portion of the moving mass coupled, by two aligned lower hanging legs which support the stress gauges, to a second portion of the peripheral frame. The alignment of the upper legs is perpendicular to the alignment of the lower legs.

According to an embodiment of the invention, an upper surface of the peripheral frame includes fastening tabs with a shoulder formed in the first pole piece. The surfaces of the fastening tabs facing the moving mass forms means for limiting the displacements of the moving mass toward the magnet.

According to an embodiment of the invention, a second pole piece forms, in addition to an extremity of each air-gap, an external hanging arch for hanging the accelerometer in a casing, the frame having no direct contact with the casing.

According to an embodiment of the invention, the fastening tabs are formed in a third plate made of a non-magnetic material, fastened over the first surface of the first plate forming the moving mass.

According to an embodiment of the invention, a fourth plate made of a non-magnetic material is fastened on the free surface of the second plate which forms the moving mass. The fourth plate includes, vertically with respect to the second portion of the moving mass and of its hanging legs, a central recess whose depth defines the displacement range of the moving mass in a direction opposite to the magnet.

According to an embodiment of the invention, a fifth plate made of non-magnetic material is sandwiched between the first and second plates. The fifth plate includes a central area which defines a third portion of the moving mass and is coupled, by hanging legs distributed on all the sides of the moving mass, to the peripheral frame.

According to an embodiment of the invention, the plates made of a non-magnetic material are silicon plates.

According to an embodiment of the invention, the center of inertia of the moving mass is within a plane interposed between a plane including the upper hanging legs and a plane including the lower hanging legs.

The present invention further provides a method for fabricating a moving mass of an electromagnetic accelerometer including stress gauges which form sensors for detecting the displacement of the moving mass designed to servocontrol a supply current of a coil supported by the moving mass. The method includes the following steps:

forming, at the periphery of a central area of a first oxidized surface of a first silicon plate, a plane winding of conductive tracks for forming the coil;

coating the coil with an insulating layer and forming two electric connection tracks of the coil from the periphery of the first surface, the connection tracks being aligned;

forming, vertically to the core of the coil, a recess from the first surface, and etching, from the second surface of the first plate, a through-hole about the coil while maintaining two hanging legs between the so-defined central area and a peripheral frame;

forming, in a first surface of a second silicon plate, two groups of two aligned piezo-resistive stress gauges;

coating the gauges with an insulating layer and forming four electric connection tracks of the gauges from the periphery of the first surface of the second plate, the connection tracks being aligned with the gauges;

forming, from the second surface of the second plate, a hole for defining a central area while maintaining, over each group of gauges, a hanging leg of the central area to a peripheral frame; and assembling the two plates by fastening the second surface of the first plate to the second surface of the second plate, the central areas of the two assembled plates forming the moving mass suspended to a peripheral frame and the hanging legs of the first plate being perpendicular with the hanging legs of the second plate.

According to an embodiment of the invention, the method consists of maintaining, when forming the through-holes in each plate, legs for temporarily maintaining the central areas designed to relieve the hanging legs during the subsequent steps of fabrication and assembling, the temporary legs being removed once the accelerometer is assembled.

The foregoing and other objects, features, aspects and advantages of the invention will become apparent from the following detailed description of the present invention when taken in conjunction with the accompanying drawings.

BRIEF DESCRIPTION OF THE DRAWINGS

FIG. 1 is a schematic diagram of an embodiment of an accelerometer according to the invention;

FIGS. 2A–2C are cross-sectional and top views, respectively, of an embodiment of an electromagnetic accelerometer according to the invention;

For the sake of clarity, the figures are not drawn to scale. In addition, the same elements are designated with the same references in FIGS. 2–10.

DETAILED DESCRIPTION

Figure 3:
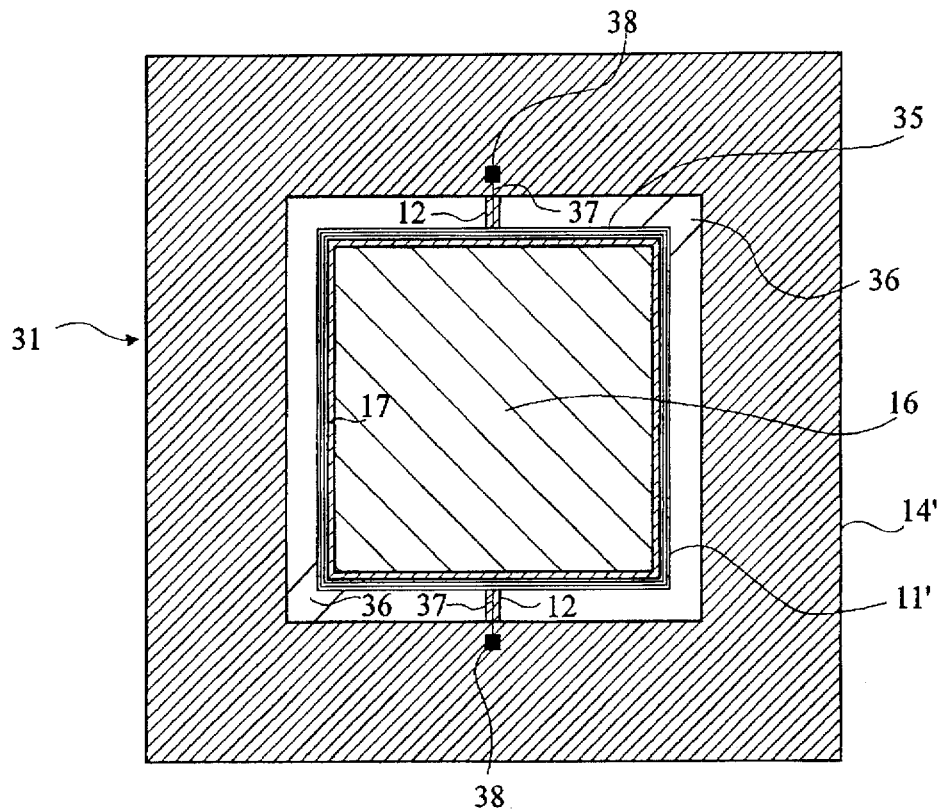
FIG. 3 is a top view of a first plate forming a moving mass of an accelerometer as shown in FIGS. 2A–2C.

FIG. 1 illustrates the working principle of an electromagnetic accelerometer.

Such an accelerometer includes a moving mass 1, or seismic mass, suspended by legs 2 and 3 to a fixed frame 4. The moving mass 1, its hanging legs 2 and 3 and frame 4 are, for example, formed from silicon plates. A coil 5 is fastened on a surface of the moving mass 1. Coil 5 is associated with a magnetic circuit formed by two pole pieces 6 and 7. The pole pieces 6 and 7 define two air-gaps 8 for channeling the magnetic field of a magnet 9 whose rotation axis is perpendicular to the surface of the moving mass 1. Air-gaps 8 are disposed vertically to coil 5. A first pole piece 6 coupled to a first pole of magnet 9 is vertical to the core of coil 5. Hanging legs, for example, the upper legs 2, include stress gauges 10 which form sensors for detecting the displacements of the moving mass 1.

Stress gauges 10 are designed to generate, through an electronic circuit 11, a supply current I of coil 5 to electromagnetically compensate for displacements of the moving mass 1 in response to external conditions, for example seismic motion. The compensation for displacements of the moving mass 1 in response to the electromagnetic induction forces is achieved along a direction symbolized by the double arrow F which corresponds to the magnetic axis of magnet 9. The value of the displacement that would have been withstood by the moving mass 1, in response to the external conditions, is determined from the value of current I needed to avoid, through a servocontrol device, the displacement of the moving mass 1. The value of current I is, for example, extracted through a resistor R as a voltage across two output terminals C and D.

For the sake of clarity, the electronic circuit 11 is symbolically represented by indicating its functional connections with coil 5 and a single stress gauge 10.

FIGS. 2A–2C represent an embodiment of an accelerometer according to the invention. FIGS. 2A and 2B are cross-sectional views along perpendicular planes. FIG. 2C is a top view. The sectional planes of FIGS. 2A and 2B are indicated in FIG. 2C by lines A–A' and B–B', respectively.

An accelerometer according to the invention includes a moving mass 11 suspended by legs 12 (FIG. 2B) and 13 (FIG. 2C) to a frame 14. The moving mass 11 has a central recess 16 which defines a peripheral shoulder 17. Shoulder 17 receives, on its upper surface, a coil (not shown) formed by a plane winding of conductive tracks. The accelerometer is, according to this embodiment, square-shaped so that the coil is formed by a winding having linear portions.

The coil is associated with a magnetic circuit formed by two pole pieces 18 and 19. The pole pieces 18 and 19 define two linear air-gaps 20 (FIG. 2A) for channeling the magnetic field of a permanent magnet 21 located vertically to the core of the coil and whose magnetic axis is perpendicular to the surface of the moving mass 11.

A first pole piece 18, coupled to a first pole of the magnet 21, has a free end which forms a first extremity of the two air-gaps 20 and can be included within recess 16 of the moving mass 11. A second pole piece 19 is, in a transversal section and along a cross-sectional plane represented in FIG. 2A, approximately shaped like a U whose bottom is coupled to a second pole of magnet 21 and whose free extremities define a second extremity of air-gaps 20. Thus, the free extremity of shoulder 17, and thus the coil, leads into air-gaps 20.

A distinctive feature of the invention is that the coil is placed in the air gaps 20, and therefore in a magnetic field area where its supply current is perpendicular to the field lines. Thus, the characteristic of the supply current of the coil is linear as a function of the displacement stress applied to the moving mass 11 in response to external conditions.

The hanging legs 12 and 13 of the moving mass 11 are formed by two upper legs 12 (FIG. 2B) coupling two opposite sides of shoulder 17 to frame 14, in parallel with air-gaps 20. Two lower legs 13 (FIG. 2A) perpendicular to the upper legs 12 suspend, by two opposite sides, the lower extremity of the moving mass 11 to frame 14. Legs 13 have stress gauges (not shown).

The first pole piece 18 includes, in a plane parallel with the surface of the moving mass 11, two shoulders 22 (FIG. 2B) perpendicular to air-gaps 20. Shoulders 22 form surfaces for receiving the fastening tabs 23 of frame 14.

The second pole piece 19 forms, in a sectional plane perpendicular with air-gaps 20, and as represented in FIG. 2B, means for hanging the accelerometer to a casing (not shown). The second pole piece 19 is, for example, formed by a magnetic folded sheet, to define the extremities of air-gaps 20 and, perpendicular thereto, forms an arch for hanging the accelerometer. The arch has, for example, holes 24 at its extremities in order to be screwed, for example, on a printed circuit board (not shown) including an electronic circuit (not shown) such as described with relation to FIG. 1.

A further distinctive feature of the present invention is that the accelerometer is supported by the magnetic circuit.

This protects the moving mass 11 and more particularly its hanging legs 12 and 13, especially, when the accelerometer is assembled to the printed circuit. The moving mass 11 is very sensitive to shocks. By eliminating any possibility of direct contact between its frame 14 and the printed circuit, the risk for the moving mass to be damaged is avoided, especially if its hanging legs 12 and 13 are broken, for example, during the assembly of the accelerometer or during its transport.

The magnetic circuit is, for example, assembled by disposing a layer of glue 26 between each pole of magnet 21 and the pole piece 18 or 19 to which the pole is coupled. Frame 14 is assembled to the magnetic circuit, for example, by gluing (27) the fastening tabs 23 to shoulder 22.

To optimize the protection of the moving mass 11 and hanging legs 12 and 13, the displacements of the moving mass are limited by the lower surfaces of the fastening tabs 23 and by an abutment formed by a bottom 25 fastened to the free surface of frame 14. Thus, the hanging legs 12 and 13 cannot be subjected to excessive stresses when the accelerometer is at rest, i.e., when the displacements of the moving mass 11 are not compensated for by the servocontrol device. Optionally, the printed circuit board, on which the accelerometer is fastened, is pierced in front of bottom 25. Thus, the moving mass 11 only contacts the printed circuit board through the hanging arch.

The moving mass 11, frame 14, fastening tabs 23 and bottom 25 are fabricated from plates made of a non-magnetic material, for example silicon, using techniques derived from those developed for the fabrication of integrated circuits. Using these techniques allows the batch manufacturing of the moving mass and the elements associated thereto from silicon wafers. The wafers are assembled after formation of all the components associated with the moving masses that they define, and then etched to individualize the moving masses and the frame.

A first plate 31 defines a first portion of the moving mass 11 including recess 16 and upper hanging legs 12, and receiving the coil. A second plate 32 defines a second portion of the moving mass 11 and the lower legs 13 receiving the stress gauges. A third plate 33 (FIG. 2B) defines the fastening tabs 23 of frame 14 at the shoulders 22 of the first pole piece 18. A fourth plate 34 defines bottom 25. The four plates are represented, separately and in plane views, in FIGS. 3–6. The various planes along which the silicon plates are etched are symbolized by different hatched areas.

FIG. 3 is a top view of the first plate 31 which forms the first portion of the moving mass 11.

Plate 31 forms a frame 14' about a central area 11' constituting the moving mass. The central area 11' includes the recess 16 which defines shoulder 17 on the end of which is deposited coil 35 by a plane winding of conductive tracks. The central area 11' is suspended to frame 14' by legs 12. Two legs 36 also connect area 11' to frame 14', preferably in two opposite corners. Legs 36 are designed to temporarily maintain area 11' as long as the accelerometer is not assembled to relieve the hanging legs 12 during fabrication. Legs 36 are cut, for example by laser beam, once the accelerometer is assembled. Conductive tracks 37 for connecting coil 35 are deposited on legs 12 to connect the coil to connection terminals 38 of the electronic circuit.

Figure 4:
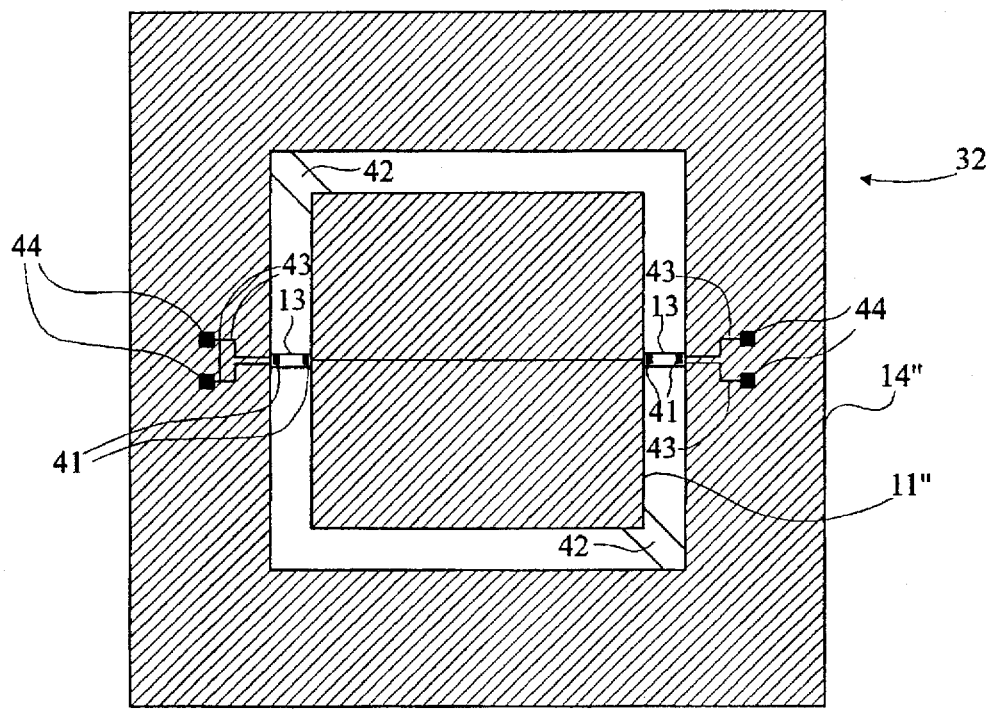
FIG. 4 is a bottom view of a second plate forming a moving mass of an accelerometer as shown in FIGS. 2A–2C.

FIG. 4 is a bottom view of the second plate 32 forming the moving mass.

Plate 32 forms a frame 14" about a central area 11" constituting the moving mass. The central area 11" is suspended to frame 14" by legs 13 on which the stress gauges 41 are fastened. Two legs 42 also connect area 11" to frame 14", preferably in two opposite corners. Legs 42 are, like legs 36 of plate 31, designed to temporarily maintain area 11" to relieve the hanging legs 13 during fabrication. Legs 36 are also cut, for example by laser beam, once the accelerometer is assembled. Conductive tracks 43 for connecting the stress gauges 41 are deposited on legs 12 to connect the gauges to connection terminals 44 of the electronic circuit.

An advantage of the present invention is that the fact of separating the fabrication of plate 31 supporting coil 35 from the fabrication of plate 32 supporting the stress gauges 41, simplifies the fabrication steps, more particularly for the realization of the conductive tracks.

Figure 5:
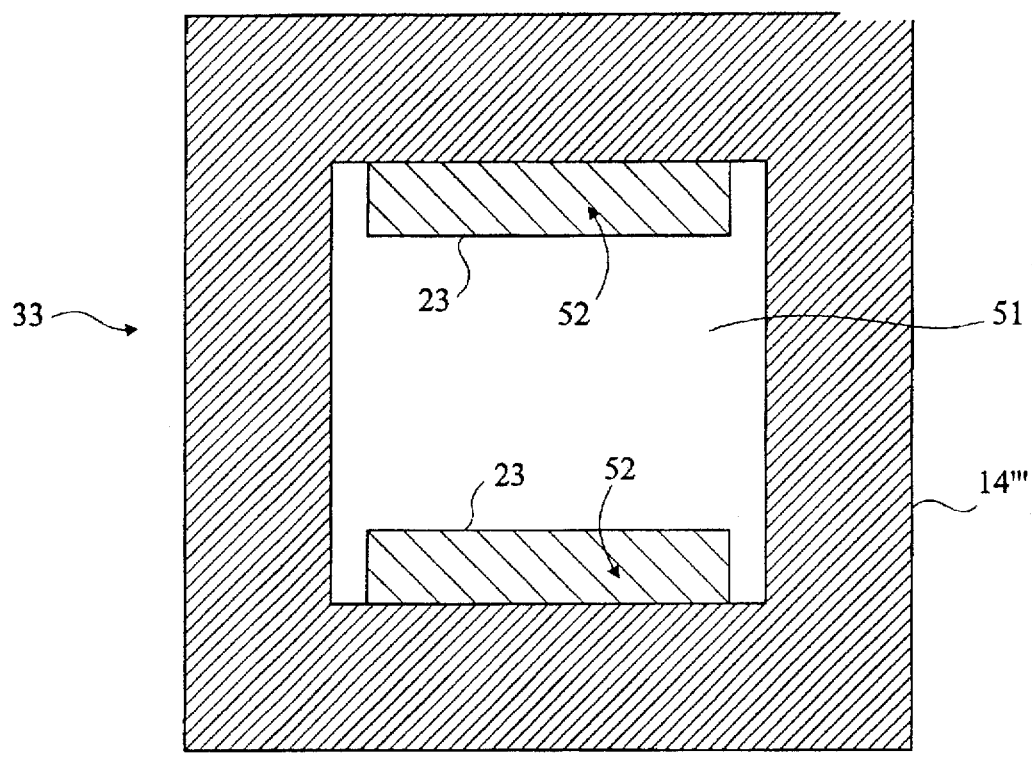
FIG. 5 is a bottom view of a third plate forming means for hanging a moving mass of an accelerometer as shown in FIGS. 2A–2C.

FIG. 5 is a bottom view of the third plate 33 in which the fastening tabs 23 are formed.

Plate 33 forms a frame 14''' about a central aperture 51 for allowing the passage of the free extremity of the first pole piece 18. The two fastening tabs 23 are formed, protruding from the inner periphery of frame 14''', from two opposite sides of the frame. The fastening tabs 23 define, from the lower surface of plate 33, a shoulder 52 forming an abutment for the moving mass. The upper surfaces of the fastening tabs 23 form surfaces to fix, for example by gluing, frame 14 in shoulders 22 of the first pole piece 18.

Figure 6:
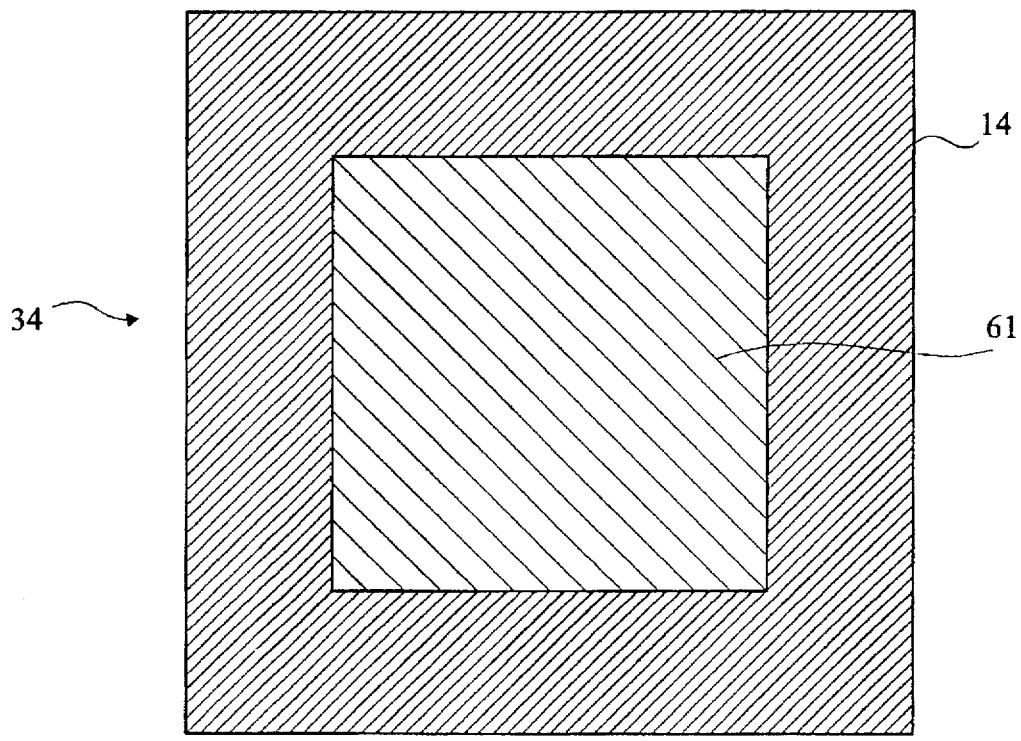
FIG. 6 is a top view of a fourth plate forming the bottom of a moving mass of an accelerometer as shown in FIGS. 2A–2C.

FIG. 6 is a top view of the fourth plate 34 forming the bottom 25.

Plate 34 includes a central recess 61 having a surface at least equal to the surface within which are included the second area 11" and its hanging legs 13 in plate 32. Recess 61 is designed to define an abutment for the moving mass 11. The depth of recess 61, added to the depth of shoulder 52 of plate 33, defines the displacement range of the moving mass 11.

A further distinctive feature of the invention is to provide short hanging legs 12 and 13 to increase their rigidity. This is advantageous in that it increases the gain of the servo-control loop, which decreases the influence of noise on the measurement results.

By way of a specific exemplary embodiment, magnet 21 is a regular hexahedron made of samarium-cobalt whose edges are approximate. 1.6-mm long. The air-gaps 20 are approximately 0.8-mm wide and approximately 0.4-mm high. The sides of frame 14 are approximately 8-mm long and approximately 2.5-mm wide. The hanging legs 12 and 13 are approximately 0.5-mm long so that the moving mass is included within a square surface having a 5-mm side. Legs 12 and 13 have a thickness of approximately 6 µm and a width of approximately 50 µm. The height of the moving mass is approximately 2 mm and its mass is approximately 100 milligrams. Coil 35 includes fifteen turns. The useful length of the linear portions of coil 35 is approximately 3.5 mm to provide a margin to optimize the performance of the accelerometer and the size of the electromagnetic circuit. Thus an accelerometer having very rigid legs (approximately 80 N/m) for hanging the moving mass is obtained.

FIGS. 7A–7E, which are partial cross-sectional views of a first silicon plate 31, illustrate manufacturing steps of the first plate of the moving mass according to the invention.

It can be, for example, a P-doped plate including on a first surface 71 (FIG. 7A), an N-doped epitaxial layer 72, the two surfaces 71 and 73 of the plate being preferably oxidized.

Coil 35 constituted by a plane winding of linear portions 74 is electroformed over the first surface 71, on a thin bonding layer (not shown), for example made of chromium or gold, deposited by photoetching. The material deposited by electroforming is, for example, copper, gold, or any other conductive material.

Then, an insulating layer 75 (FIG. 7B), for example made of silicon nitride, is deposited over the whole plate and photoetched according to the pattern within which coil 35 is included. Two apertures 76 are formed in face of two portions 74 forming the coil's extremities.

A conductive layer, for example made of chromium/gold, is then deposited and etched to form two tracks 37 (FIG. 7C) for electrically connecting the coil. The two tracks 37 are aligned, at least in the area where they rest over the hanging legs 12 which are subsequently formed.

The first surface 71 is coated with a temporary layer 77 (FIG. 7D), for example made of nitride, to protect the tracks 37 and then etched vertically to the core of the coil to form a preform 78 of recess 16 crossing layer 72.

Then, successive photoetching steps are achieved, from the two surfaces 71 and 73 of plate 31, to form a hole 79 (FIG. 7E) about coil 35 by maintaining, vertically to tracks 37, two hanging legs 12 formed by the oxidized N-doped epitaxial layer. Two legs 36 for temporarily maintaining the obtained central area 11' are also left in two opposite corners of aperture 79. Last the temporary layer 77 is etched away.

Figure 7A:
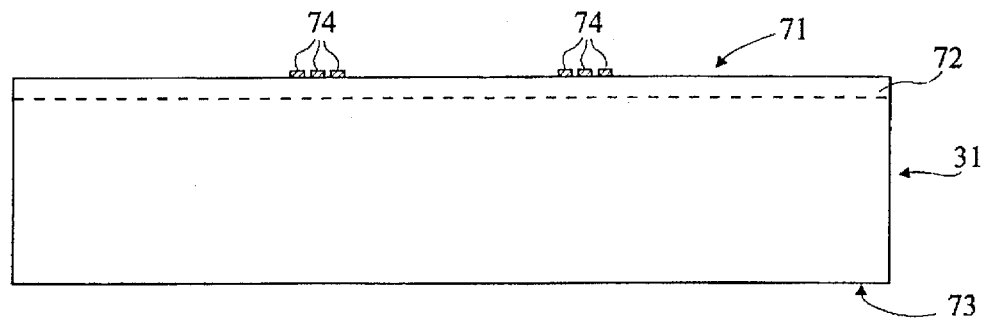
FIGS. 7A–7E illustrate steps of an implementation of the method according to the invention for fabricating a first plate of a moving mass as shown in FIG. 3.
Figure 7B:
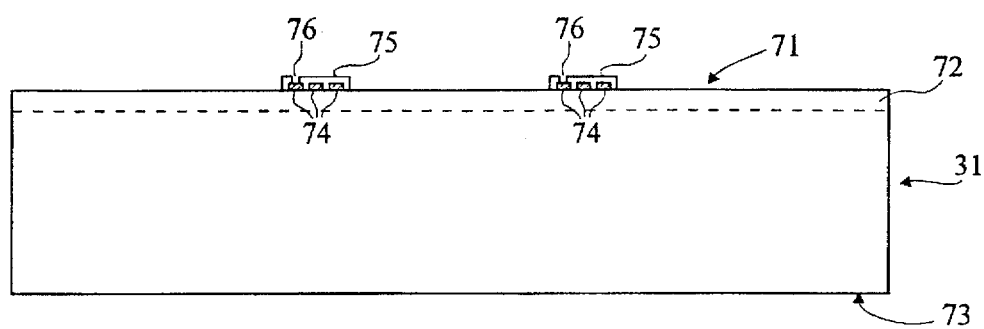
Figure 7C:
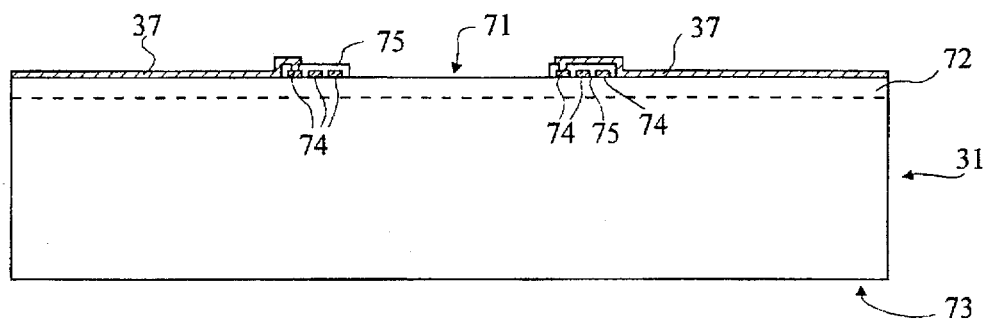
Figure 7D:
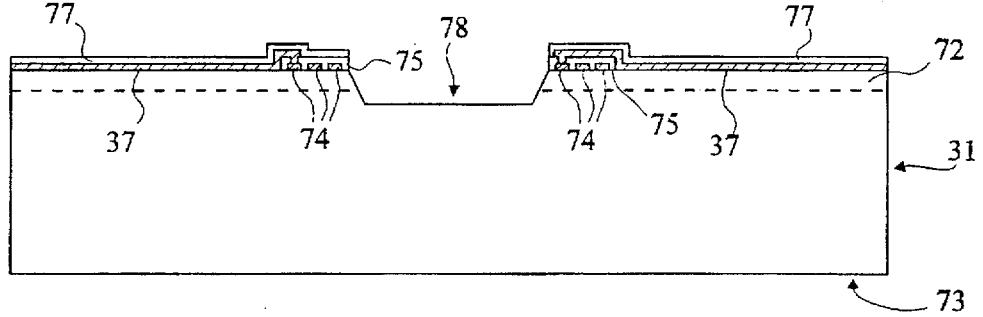
Figure 7E:
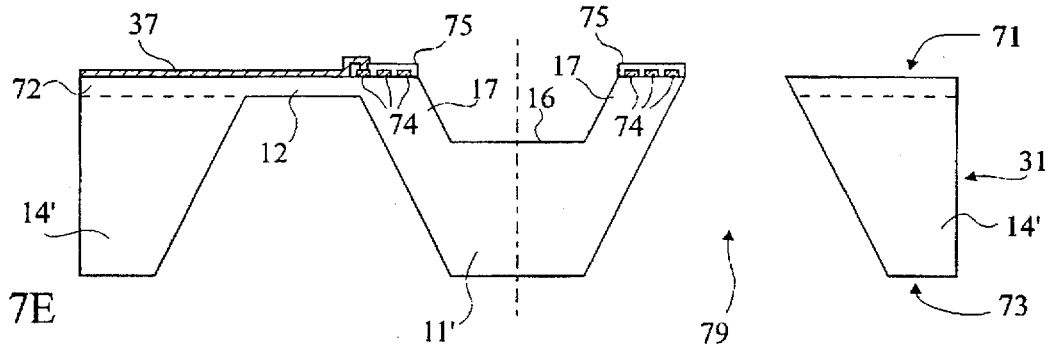

The right portion of FIG. 7E is a cross-sectional view along a plane perpendicular to the cross-sectional plane of FIGS. 7A–7D and of the left portion of FIG. 7E. Legs 36 are not visible in FIG. 7E because of the sectional planes.

Preferably, the silicon plate is chemically etched. The etching angle of the etching is determined by the crystalline structure of silicon and is a 54.74° angle between the plane of the plate (100) and the plane (111).

By way of a specific exemplary embodiment, plate 31 has a thickness of approximately 0.8 mm. The thickness of the N-doped epitaxial layer defining the thickness of legs 12 is approximately 6 µm. Portions 74 of the coil have a thickness of approximately 3 µm, a width of approximately 5 µm and a pitch of approximately 10 µm. The width of shoulder 17, between aperture 79 and recess 16, is approximately 0.2 mm.

FIGS. 8A–8E illustrate steps of a fabrication method of the second plate of the moving mass according to the invention. The figures are partial cross-sectional views of a second silicon plate 32.

Plate 32 can be, for example, like the first plate, a P-doped plate including, on a first surface 81 (FIG. 8A), an N-doped epitaxial layer 82. An oxide layer 83 obtained by implantation is buried in layer 82. The second surface 84 is coated with a nitride layer (not shown).

The stress gauges 41 (FIG. 8B) are formed by photoetching the first surface 81 up to the oxide layer 83. The four piezo-resistive gauges are aligned by pair. Two groups 85 of two aligned gauges 41 are formed in front of the position of the subsequent hanging legs 13.

Then an insulating layer 86 (FIG. 8C), for example made of silicon nitride is deposited over the whole plate. Apertures 87 are formed so as to face each gauge 41 and a conductive layer, for example made of aluminum, is then deposited and etched to form tracks 43 to electrically connect each gauge 41. Tracks 43 associated with a group 85 of gauges 41 are aligned, at least in the area where they will rest on the hanging legs 13 which are subsequently formed.

The first surface 81 is coated by a layer 88 (FIG. 8D), for example made of nitride, for protecting tracks 43.

Figure 8A:
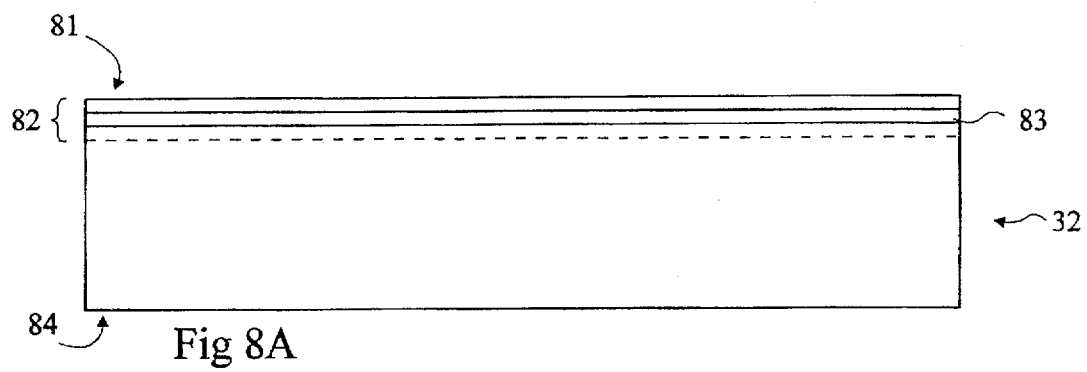
FIGS. 8A–8E illustrate the steps of an implementation of the method according to the invention for fabricating a second plate of a moving mass as shown in FIG. 4.
Figure 8B:
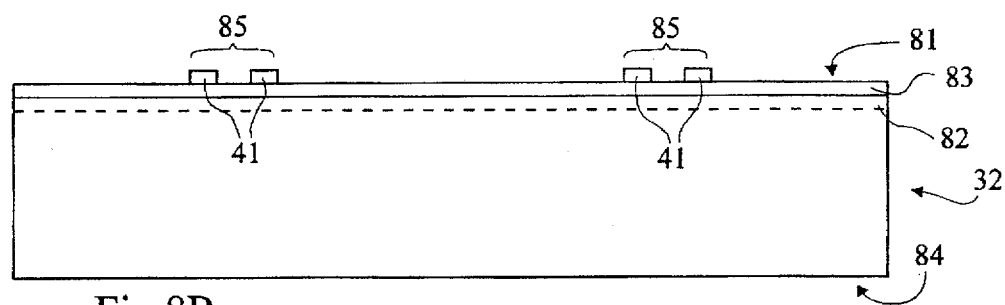
Figure 8C:
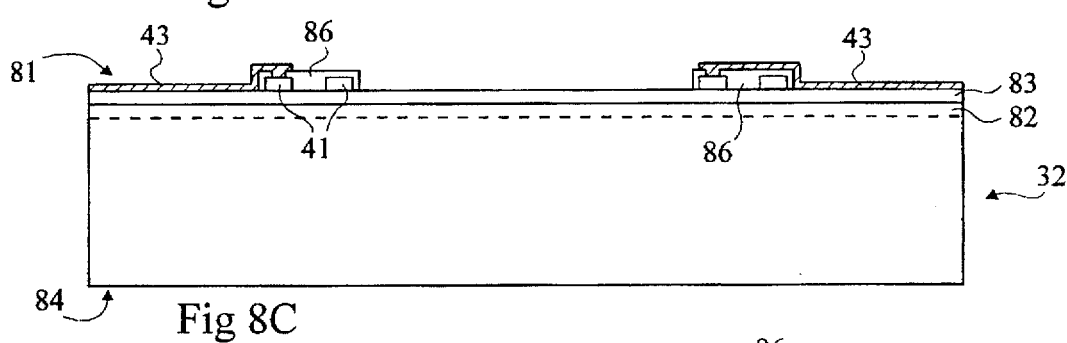
Figure 8D:
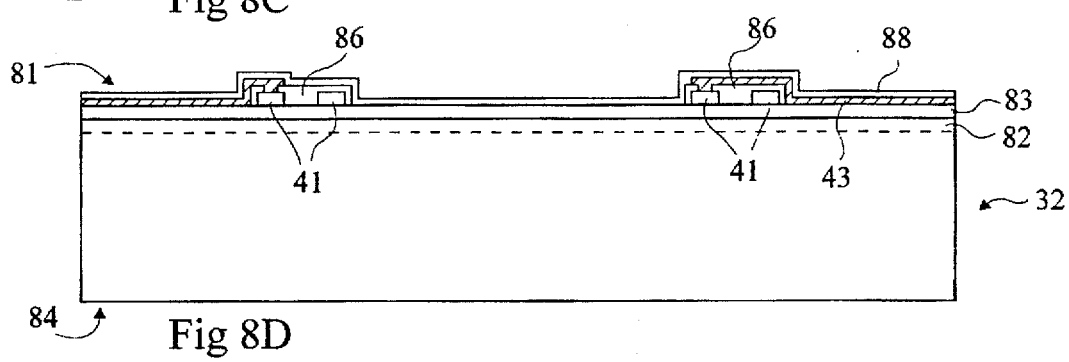
Figure 8E:
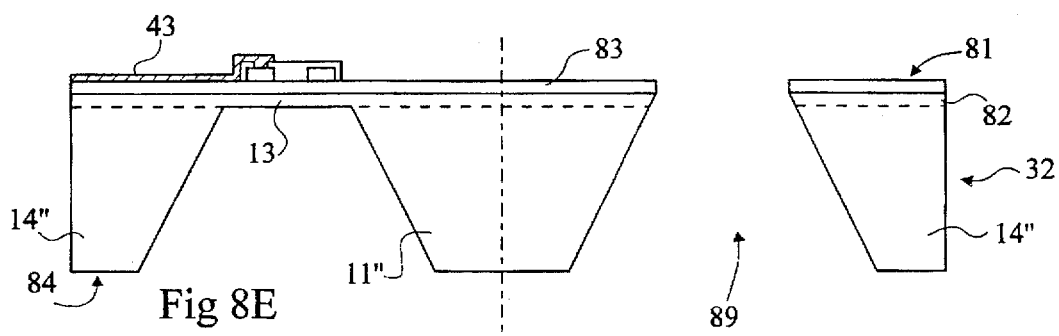

An aperture 89 (FIG. 8E) is formed by photoetching, from the second surface 84 of plate 32 to create the second portion 11" of the moving mass by maintaining, in front of groups 85 of gauges 41, two hanging legs 13 formed by an oxide N-doped epitaxial layer. The legs 42 (shown in FIG. 4) are also left in two opposite corners of aperture 89 to temporarily maintain the central area 11". Layer 88 is finally totally eliminated from the first surface 81. The right-hand portion of FIG. 8E is a cross-sectional view according to a plane perpendicular to the sectional plane of FIGS. 8A–8D and of the left portion of FIG. 8E. Legs 42 (shown in FIG. 4) are not visible in FIG. 8E because of the section plane.

Preferably, also in this case, the silicon plate is chemically etched, with a 54.74° etching angle between the plane of plate (100) and the plane (111).

By way of an exemplary embodiment, plate 32 has a thickness of approximately 0.8 mm and the thickness of the N-doped epitaxial layer is approximately 6 µm. The layer devoid of N-doped silicon, after oxide implantation, has a thickness of approximately 0.5 µm which corresponds to the thickness of gauges 41. The length of gauges 41 is approximately 0.1 mm on legs 13 which are approximately 0.5-mm long, 50-µm wide and 6-µm thick.

Both plates 31 and 32 are assembled, for example by gluing, by placing the second surface 72 of the first plate 31 on the second surface 82 of the second plate 32 and by placing the hanging legs 12 perpendicular to the hanging legs 13.

The etching angles that formed holes 79 and 89 give a "diabolo" shape to the moving mass 11.

Figure 9:
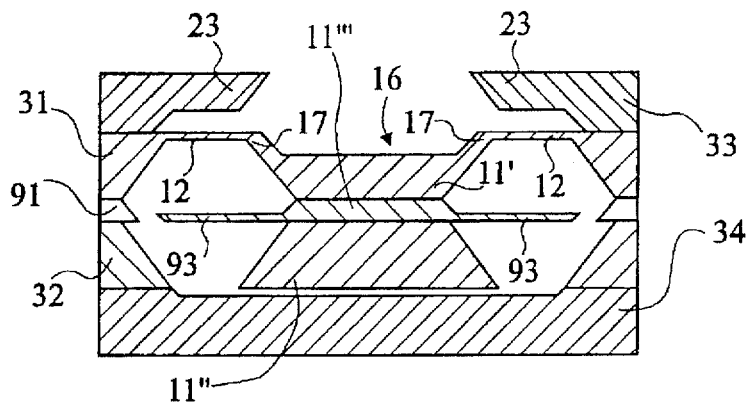
FIG. 9 represents an alternative embodiment of a moving mass of an accelerometer as shown in FIGS. 2A–2C.
Figure 10:
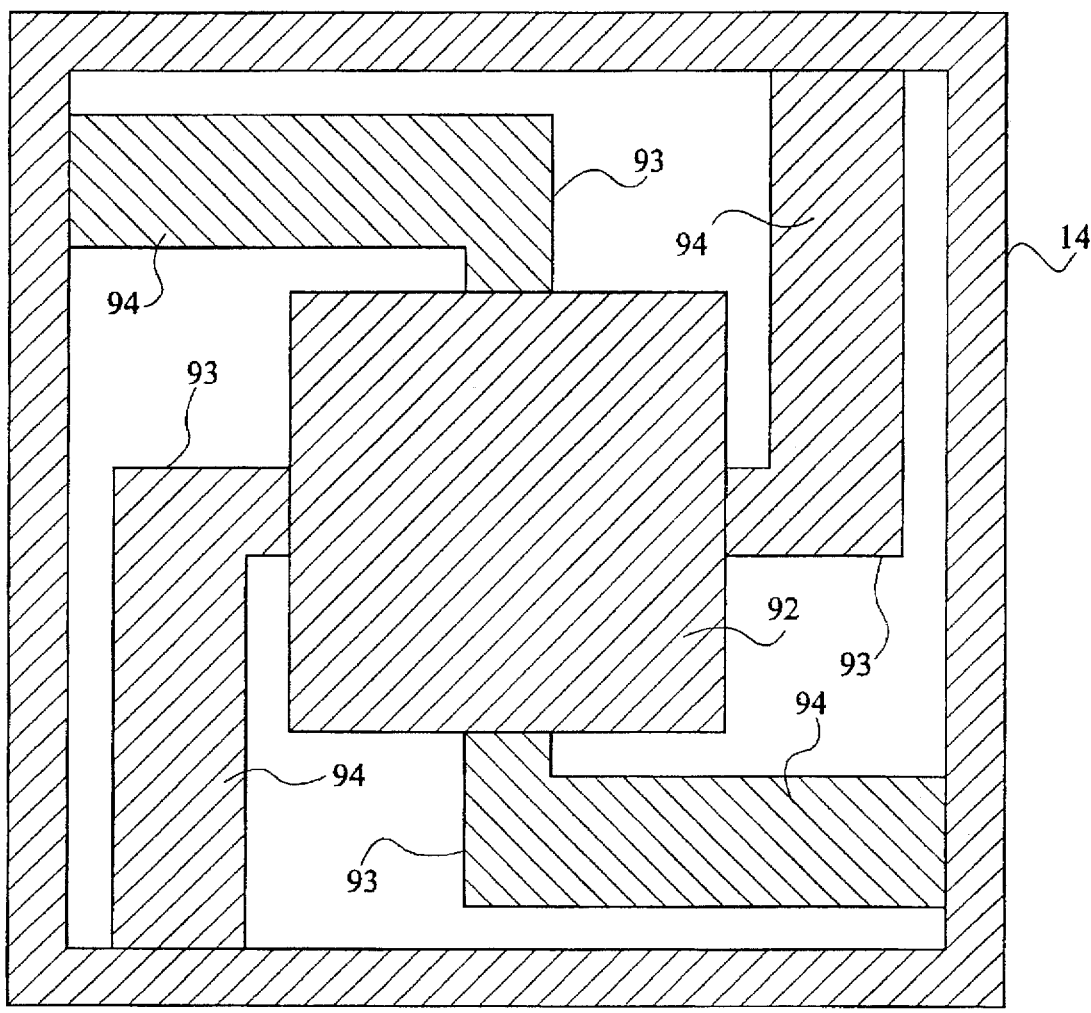
FIG. 10 is a top view of a fifth plate forming the moving mass such as represented in FIG. 9

FIGS. 9 and 10 are a cross-sectional view and a top view, respectively, of an alternative embodiment of a moving mass according to the invention. The sectional plane of FIG. 9 corresponds to the sectional plane of FIG. 2B.

In this alternative, a fifth silicon plate 91 is sandwiched between the first plate 31 and second plate 32 forming the moving mass 11. The fifth plate 91 includes a central area 92 (FIG. 10) forming a third portion 11''' of the moving mass 11. The central area 92 is coupled to frame 14 by hanging legs 93 which are, preferably as represented in FIG. 10, present on all the sides of the moving mass.

An advantage of this alternative is that it increases the moving mass 11 while using silicon wafers of a standard thickness (for example 0.8 mm).

A further advantage of this alternative is that the center of gravity of the moving mass 11 can be made to coincide with its geometric center in order to limit the twisting of the legs supporting the stress gauges. The center of inertia of the moving mass 11 is then within a plane included between the plane containing the upper hanging legs 12 and the plane containing the lower hanging legs 13.

A still further advantage, due to the etching angles of the etching steps realized in plates 31 and 32, is that the distance separating the moving mass 11 from frame 14, at the hanging legs 93, is more important than the distance separating the moving mass from the frame, at the hanging legs 12 of plate 31 or the legs of plate 32 supporting the stress gauges. This important distance enables the formation of legs 93 which have a portion 94 parallel with the side of the moving mass with which they are respectively associated. Thus, legs 93 limit the displacements of the moving mass further to lateral shocks without impairing the vertical displacements of the moving mass 11. Therefore, legs 93 perform a function that is distinct from that of legs 12 and 13 and do not impair the measurements made by the stress gauges 41. Legs 13 of plate 32 are not visible in FIG. 9 because of the section plane.

As is apparent to those skilled in the art, various modifications can be made to the above disclosed preferred embodiments. In particular, each described component can be replaced with one or more components performing the same function.

In addition, although the above description relates to a square-shaped accelerometer, the invention also applies to the realization of accelerometers having a rectangular or polygonal shape.

Also, the materials constituting the layers deposited onto plates 31 and 32 can be replaced with one or more materials performing the same function, and the means that are used for deposition and etching can be replaced with other means performing the same function.

We claim:

1. An electromagnetic accelerometer including a moving mass (11) suspended to a peripheral frame (14) and associated with stress gauges (41) forming sensors for detecting the displacement of the moving mass which supports a coil (35), and a permanent magnet (21) associated with a magnetic circuit formed by two pole pieces (18, 19) defining two air-gaps (20) for channeling the magnetic field of the magnet (21), said moving mass (11) including a central recess (16) having a surface at least equal to the surface of a free extremity of a first pole piece (18) of the magnetic circuit and forming a shoulder (17) for receiving said coil (35), the free extremity of said shoulder (17) leading inside the air-gaps (20), and wherein said moving mass (11) is formed by the superposition of at least two plates (31, 32) of a non-magnetic material, the first plate (31) defining a first portion (11') of the moving mass which includes, from a first surface (71), said recess (16) forming the shoulder (17) supporting the coil (35), and which is coupled, by two aligned upper hanging legs (12), to a first portion (14') of said peripheral frame (14), the second plate (32) defining a second portion (11") of the moving mass coupled, by two aligned lower hanging legs (13) supporting said stress gauges (41), to a second portion (14") of said peripheral frame (14), the alignment of said upper legs (12) being perpendicular to the alignment of said lower legs (13).

2. The accelerometer of claim 1, wherein an upper surface of said peripheral frame (14) includes tabs (23) for fastening with a shoulder (22) formed in said first pole piece (18), said fastening tabs (23) forming, by their surface facing the moving mass (11), means for limiting the displacements of the moving mass toward the magnet (21).

3. The accelerometer of claim 2, wherein a second pole piece (19) forms, in addition to an extremity of each air-gap (20), an external hanging arch for hanging the accelerometer to a casing, the frame (14) having no direct contact with said casing.

4. The accelerometer of claim 2, wherein said fastening tabs (23) are formed in a third plate (33) made of a non-magnetic material, fastened over the first surface (71) of said first plate (31) forming the moving mass (11).

5. The accelerometer of claim 1, wherein a fourth plate (34) made of a non-magnetic material is fastened over the free surface (81) of said second plate (32) forming the moving mass (11), said fourth plate (34) including, vertically with respect to the second portion (11") of the moving mass and of its hanging legs (13), a central recess (61) whose depth defines the displacement range of the moving mass (11) in a direction opposite to the magnet (21).

6. The accelerometer of claim 1, wherein a fifth plate (91) made of non-magnetic material is sandwiched between said first (31) and second (32) plates, said fifth plate (91) including a central area (92) which defines a third portion (11''') of the moving mass and which is coupled, by hanging legs (93) distributed on all the sides of the moving mass, to the peripheral frame (14).

7. The accelerometer of claim 1, wherein said plates (31, 32,) made of a non-magnetic material are silicon plates.

8. The accelerometer of claim 1, wherein the center of inertia of said moving mass (11) is within a plane interposed between a plane including said upper hanging legs (12) and a plane including said lower hanging legs (13).

* * * * *